United States Patent
Smith et al.

(10) Patent No.: US 6,282,224 B1
(45) Date of Patent: Aug. 28, 2001

(54) NON-PLANAR Q-SWITCHED RING LASER SYSTEM

(75) Inventors: Irl W. Smith, Concord; Richard C. Sharp, Wayland, both of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/229,817

(22) Filed: Jan. 13, 1999

(51) Int. Cl.$^7$ .................................................. H01S 3/083
(52) U.S. Cl. ................. 372/94; 372/94; 372/10; 372/50; 372/92
(58) Field of Search .................. 372/94, 10, 50, 372/92

(56) References Cited

U.S. PATENT DOCUMENTS

| | | | |
|---|---|---|---|
| 4,710,940 | * 12/1987 | Sipes, Jr. | 372/75 |
| 4,955,034 | * 9/1990 | Scerbak | 372/94 |
| 5,052,815 | * 10/1991 | Nightingale et al. | 372/94 |
| 5,222,094 | * 6/1993 | Hanna et al. | 372/94 |
| 5,249,196 | * 9/1993 | Scheps | 372/93 |
| 5,745,511 | * 4/1998 | Leger | 372/19 |
| 5,764,681 | * 6/1998 | Ballantyne et al. | 372/94 |
| 6,002,704 | * 12/1999 | Freitag et al. | 372/94 |

OTHER PUBLICATIONS

Maker et al., Single–Frequency Diode–Pumped Nd: YAG Ring Laser With no Intracavity Elements, Optics Letters, vol. 18, No. 21, pp. 1813–1815 (Nov. 1, 1993).

Chen et al., "Semimonolithic Nd:YAG Ring Resonator for Generating cw Single–Frequency Output at 1.06 um", Optics Letters, vol. 20, No. 11, pp. 1283–1285 (Jun. 1, 1995).

Freitag et al., "Passively Q–Switched, Miniature Nd: YAG Ring Lasers with High Single–Frequency Output Power at 106nm", Optics Letters, vol. 22, No. 10, pp. 706–708 (May 15, 1997).

Pedersen et al., "Reduction of Spatial Holeburning in a Diode Pumped Nd:YAG Laser by the Use of a Composite Laser Crystal", 20th Int'l Quant. El. Conf., Sydney, Australia, Jul. 14–19, 1996.

Yu et al., "Single–Frequency Passively Q–Switched Nd:YAG Ring Laser", CLEO '97 (May 18, 1997).

Afzal, RS., J.J. Zayhowski, and T.Y. Fan, "Efficient, Single–Mode, 1.5 mJ, Passively Q–Switch Diode Pumped Nd:YAG Laser," OSA Trends in Optics and Photonics on Advanced Solid–State Lasers, 1, (1996), Optical Society of America, pp. 441–443.

Eilers, H., K.R. Hoffman, W.M. Dennis, S.M. Jacobsen, and W.M. Yen, "Saturation of 1.064 um Absorption in Cr, Ca: Y3Al5012 Crystals", Appl. Phys. Lett. 61, (1992), pp. 2958–2960.

McInnes, A., and J. Richards, "Thermal Effects in a Coplanar–Pumped Folded Zig–zag Slab Laser," IEEE J. Quant. Electron 32, (1996), pp. 1243–1252.

Siegman, A.E., Lasers, University Science Books, 1986, pp. 858–922.

* cited by examiner

Primary Examiner—Frank G. Font
Assistant Examiner—Delma R. Flores Ruiz
(74) Attorney, Agent, or Firm—Iandiorio & Teska

(57) ABSTRACT

A non-planar Q-switched ring laser system including a ring laser having a gain medium and a closed optical path lying in at least two distinct planes, and a Q-switch in the closed optical path for automatically varying the loss in the closed optical path.

12 Claims, 7 Drawing Sheets

NON-PLANAR Q-SWITCHED RING LASER SYSTEM

FIELD OF INVENTION

This invention relates to a non-planar, Q-switched ring laser system, and more particularly to a high power, optically self aligning, non-planar Q-switched ring laser system.

BACKGROUND OF INVENTION

Pulsed lasers such as used in laser radar and industrial applications are limited in output pulse energy by the risk of damage to the internal optics. The output energy can be increased by increasing the mode volume by increasing the radius of curvature of the resonator mirrors. However, as the mirror radius is made longer the resonator becomes more susceptible to misalignment: the larger the mirror radius the greater is the shift of the optical axis for a given tilt misalignment of the mirrors or other optical elements of the resonator. Non-planar ring lasers promote enhanced optic axis stability but the light circulates within a closed path in two distinct directions, e.g., clockwise and counterclockwise, so that the output of such lasers is emitted in two beams which cannot be efficiently combined into a single beam to maximize the output energy for a given input energy. Power output can be enhanced using Q-switching but this adds significant complexity and expense to the laser.

SUMMARY OF INVENTION

It is therefore an object of this invention to provide an improved non-planar passively Q-switched ring laser system.

It is a further object of this invention to provide such a non-planar passively Q-switched ring laser system which is high power and optically self-aligning.

It is a further object of this invention to provide such a non-planar passively Q-switched ring laser system with greatly reduced alignment sensitivity.

It is a further object of this invention to provide such a non-planar passively Q-switched ring laser system with simple monolithic resonator structure.

It is a further object of this invention to provide such a non-planar passively Q-switched ring laser system which is reliable, robust, low maintenance and high performance.

It is a further object of this invention to provide such a non-planar passively Q-switched ring laser system which tolerates relaxed manufacturing and alignment accuracy.

The invention results from the realization that a reliable, robust, high power laser system with reduced alignment sensitivity can be effected using a Q-switch to increase the power and utilizing the inherent self-aligning properties of a non-planar ring laser configuration to reduce susceptibility to misalignment while avoiding the complexity of an active Q-switch by using a passive Q-switch.

This invention features a non-planar Q-switched ring laser system including a ring laser including a gain medium and a closed optical path lying in at least two distinct planes, and a Q-switch in the closed optical path for automatically varying the loss in the closed optical path.

In a preferred embodiment the closed optical path may include a non-planar arrangement of an even number of reflectors, at least four in number. The Q-switch may be a passive Q-switch and may be integrally formed with the gain medium. The gain medium may include Nd:YAG, the Q-switch may include Cr:YAG and the Nd:YAG and Cr:YAG may be fused together. There may be an optical diode for limiting the direction of oscillation to one or two possible senses. There may be at least one pair of optically adjacent reflectors including means for totally internally reflecting the beam from the laser. The plane of incidence of one of the pair of means for totally internally reflecting may be substantially perpendicular to the plane of incidence of the other of the pair. The angle of incidence of the laser output beam on each of the means for totally internally reflecting may be substantially equal.

DISCLOSURE OF PREFERRED EMBODIMENT

Other objects, features and advantages will occur to those skilled in the art from the following description of a preferred embodiment and the accompanying drawings, in which.

Figure 1:
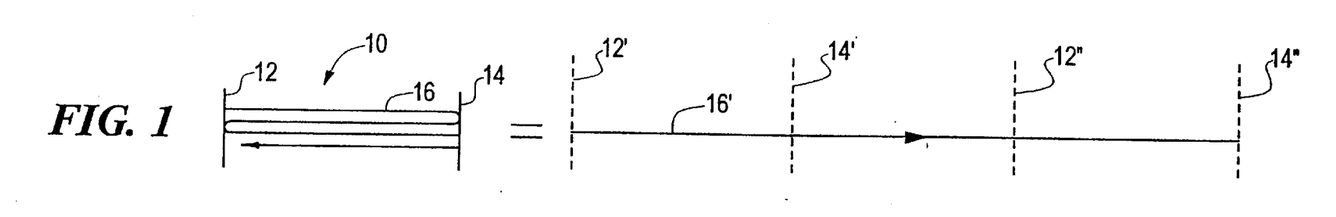
FIG. 1 is a schematic view of a laser beam reflecting back and forth along the optic axis of a resonant cavity and its equivalent in expanded or unfolded form.
Figure 2:
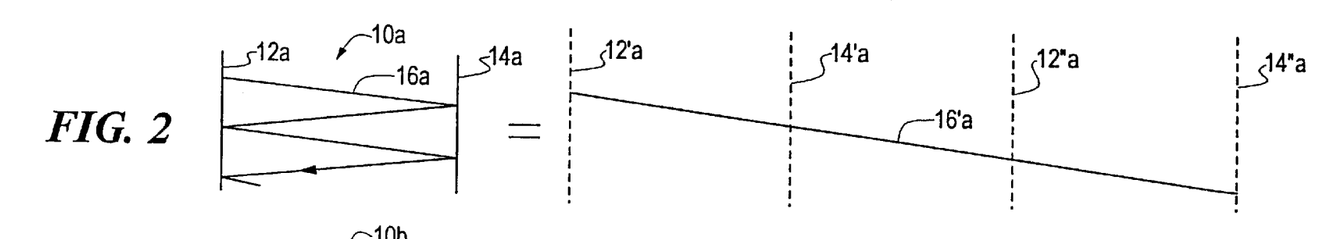
FIG. 2 is a view similar to FIG. 1 where the laser beam is at a slight angle to the optic axis.

There is shown in FIG. 1 a laser resonator 10 including two flat or plano mirrors 12 and 14 between which reflects laser beam 16. The equivalent expanded view shows the mirrors repeating as mirrors 12', 14', 12", 14" to show the laser beam 16 extending in a straight line 16'. In FIG. 2 an identical resonator 10a is shown acting upon a beam initially at a small angle to the beam in FIG. 1. The laser beam 16a diverges gradually, as shown at 16a', from the path observed by laser beam 16', FIG. 1. Under conditions due to age, temperature, vibration or fabrication variations where the resonator 10b, FIG. 3, contains some erroneous alignment of parts symbolized by wedge 18b, laser beam 16b departs much more dramatically from the path 16', FIG. 1, of the normal laser beam because each time the beam is reflected it is again subjected to the same error conditions as indicated by the presence of wedge 18b', 18b", 18b'".

Figures 3, 4:
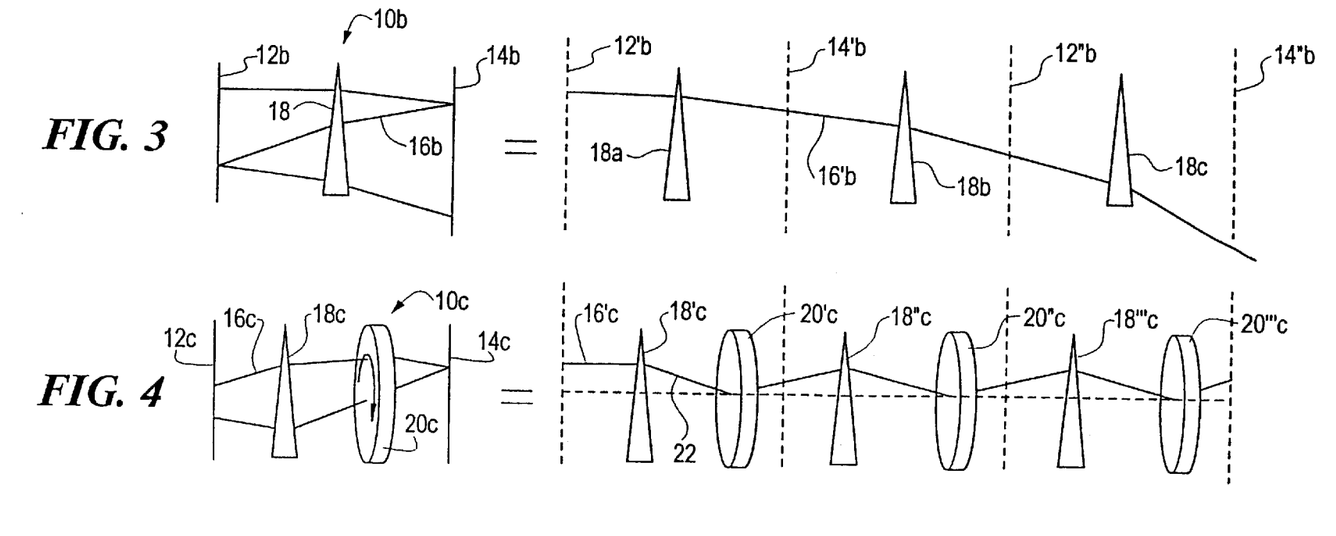
FIG. 3 is a view similar to FIG. 1 showing rapidly increasing misalignment of the laser beam due to misalignment of optical components as modeled by an intracavity small-angle prism.
FIG. 4 is a view similar to FIG. 1 illustrating the manner in which rotation effected by non-planar ring laser geometry can reduce misalignment of the laser beam.

In accordance with this invention, however, the errors represented by wedge 18c, FIG. 4, can be compensated for by the rotation symbolized by rotator 20c actually effected by a non-planar ring resonator having an even number of four or more reflectors in a non-planar configuration. Fewer than three would not constitute a ring, and three alone would result in a cancellation of the effect as can be seen in the description with reference to FIGS. 5, 6 and 7 following. With respect to FIG. 4 it can be seen that as the laser beam 16c rebounds back and forth between mirrors 12c and 14c the misalignment is minimized. That is, each time the beam 16'c moves away from the central axis 22 because of the effect of one of the wedges 18'c, 18"c, 18"'c, it is brought back toward axis 22 by the rotational action symbolized by rotators 20'c, 20"c, 20"'c. The nature of this rotation can be understood from FIG. 7 after first obtaining a fundamental understanding from FIGS. 5 and 6.

Figure 5:
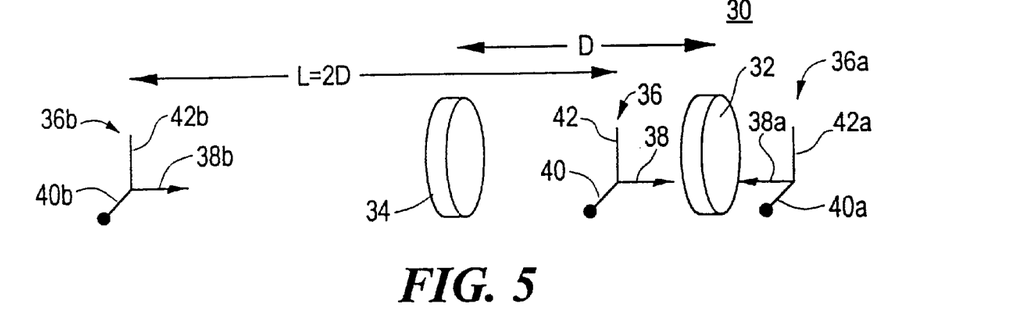
FIG. 5 is a simplified ray diagram showing the effect of reflections in a two-mirror resonator.
Figure 6:
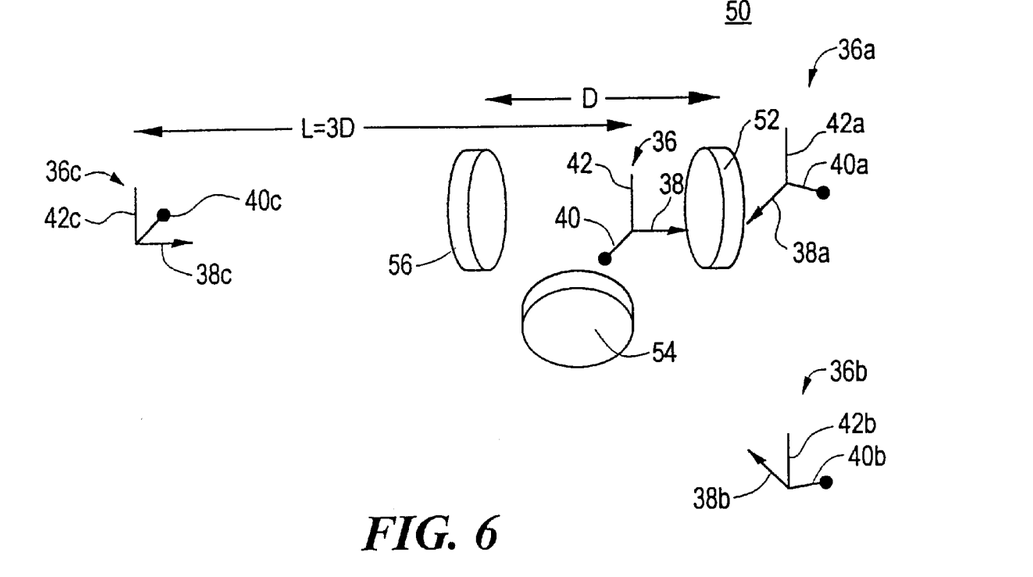
FIG. 6 is a view similar to FIG. 5 for a three-mirror resonator.
Figure 7:
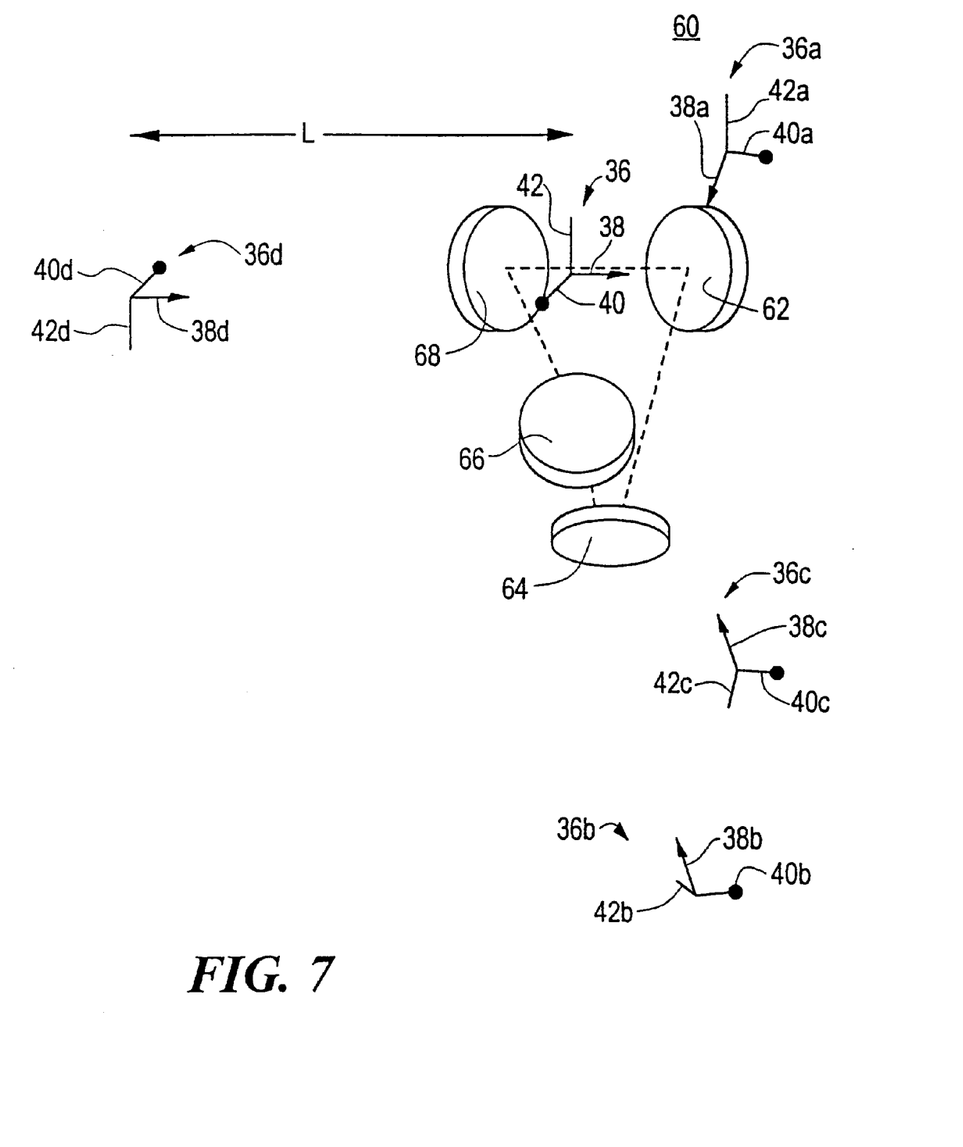
FIG. 7 is a view similar to FIG. 5 for a four-mirror non-planar ring resonator.

In FIG. 5 there is shown a two-mirror resonator 30 including two mirrors 32 and 34 spaced apart a distance D. The object 36 is composed of three mutually perpendicular elements, one with an arrowhead 38, one with a dot 40 and one just a line 42. This object possesses a mathematical property called "handedness" which is important in understanding the explanations herein. If the object is oriented so that its origin (the point where the three elements are joined) is pointed away from the observer, then the plain, arrow-tipped, and dot-tipped elements are seen to be arranged in that order while counting in a clockwise direction. This will be referred to as being "right-handed"; if the arrangement in the stated order occurs while counting in a counter-clockwise direction, the object would be "left-handed". When object 36 is reflected in reflector 32 its image 36a appears at the position as shown. It will be noted that the object has been changed from right-handed to left-handed by the reflection. This is a fundamental mathematical property of reflection in a mirror. When image 36a is reflected in mirror 34 it appears as image 36b with the elements once again aligned as they are in the original object 36, i.e., right-handed, and no rotation has occurred. The distance between the object 36 and image 36b, L, is equal to 2D. In a ring laser 50, FIG. 6, using three mirrors 52, 54 and 56, a different effect results. Here again, object 36 contains three elements 38, 40 and 42 in a right-handed orientation. Image 36a is left-handed as a result of reflection in the first reflector 52. When image 36a is projected to reflector 54 it appears as image 36b once again having the same handedness of its elements as the original object 36. Now with image 36b reflected through reflector 56 the new image 36c appears with the opposite handedness as the original. Since the object 36c has a different handedness than object 36, there is no rotation which would be able to make object 36 identical to object 36c. The distance between mirrors 52 and 56 is D as previously; the distance between object 36 and the final image 36c, L, is equal to 3D. Using an even number of mirrors of four or more in the ring resonator and arranging them in a non-planar configuration as shown in FIG. 7, results in a non-planar ring resonator 60 utilizing four reflectors 62, 64, 66 and 68, where at least reflector 66 is not in the same plane as the other three reflectors. In this case, after the reflection in reflectors 62 through 68 the fifth image 36d appears rotated 180°. It is this rotation, that occurs naturally when there are an even number of reflections of four or more in a nonplanar arrangement, which effects the constraining or correction of the divergence as shown in FIG. 4.

To more fully and precisely explain why rotation about the optic axis confers increased stability of the resonator's operation through much greater resistance to misalignment, we use an algebraic formalism which builds on the ideas just presented. We choose an x-y plane transverse to the optic axis and consider the action of the resonator on a general paraxial ray passing through the plane. The ray will be defined by transverse coordinates "x" and "y" and small ray slopes of "u" and "v". It will be convenient to use complex notation in what follows: define the complex coordinate $z=x+jy$ and slope $w=u+jv$. For example, a ray at (x,y), i.e., z, with slopes (u,v), i.e., w, is transformed by propagating a distance L into a ray at (x+uL,y+vL) with unchanged slopes (u, v), i.e., into $\{z+wL,w\}$. Instead, if the ray were to be reflected in the plane containing the optic axis and the x axis, the transformation (which reverses both y and v) would be $\{z, w\} \rightarrow \{z^*, w^*\}$, where the asterisk denotes complex conjugation. Finally, a rotation about the optic axis by angle θ would give $\{z, w\} \rightarrow \{ze^{j\theta}, we^{j\theta}\}$.

This formalism also allows for the action of misalignments and focusing elements. A lens or mirror has a certain optical "power" (measured in diopters) P; a lens of focal length f has P=1/f, while a concave mirror of radius of curvature R has P=2/R. (Power is convenient because powers of successive thin lenses add, whereas focal lengths to not.) A misalignment will be characterized by the ray deviation angle A. The transformations associated with these two elements are $\{z, w\} \rightarrow \{z, w-zP\}$ (a ray deviation towards the axis which is proportional to distance from the axis) and $\{z, w\} \rightarrow \{z, w+A\}$ (a constant deviation), respectively. In this formalism A may be complex (i.e., in any direction in the transverse plane) but P is pure real.

We now have all the operations needed to write down the complete effect on a ray $\{z, w\}$ of one round trip through a resonator. Consider a resonator with even mirror number and operate first with the unperturbed resonator (translation by L, then rotation by θ), then a misalignment by A, and finally a focusing of power P. The transformation is $$\{z,w\} \rightarrow \{(z+Lw)e^{j\theta}, A+(w-P[z+Lw])e^{j\theta}\} \quad (1)$$

We are interested not so much in what the resonator does to any general ray but rather what the optic axis of the perturbed resonator becomes. Replacing the in Equation (1) by an equals sign results in an equation whose solution is that ray which is mapped onto itself by the resonator—the new optic axis. This equation is straightforward to solve and the result is $$z/(LA)=(PL-2[1-\cos\theta])^{-1} \quad (2)$$

Define a dimensionless sensitivity $S=|z/(LA)|$, the amount of optic axis shift per unit angle scaled to the length of the resonator. There are two interesting limit cases. First, if the rotation θ is substantial, then the power P is unimportant and we have $S \simeq (2[1-\cos\theta])^{-1}$, which is as small as ¼ for θ near 180°. In contrast, if θ is zero (as in any planar or linear resonator, such as the one in FIG. 5), then only the focusing power constrains the optic axis, giving a sensitivity of simply 1/PL; since resonators with large modes have PL<<1, their sensitivity is much worse than for a nonplanar resonator.

A qualitative understanding of why image rotation is so helpful may be gained by imagining travelling through the resonator with a light beam, using a coordinate frame which travels with the light beam and thus, after a round trip, is rotated by the angle θ with respect to its starting orientation. We encounter the misalignment A successively at a different orientation each round trip, so the effect is mostly averaged out—as long as the rotation is non-zero. However, with θ of zero, the successive misalignments keep adding up and are finally only canceled by the increasing wedge angle as we traverse the lens (power P) further and further away from the center.

A solid-state laser may have angular misalignments at the milliradian level with pumping of a few watts average power into a rod a few mm in size; the actual misalignment depends sensitively on the symmetry of the pumping and heatsinking. For such a case with L of a few cm, the nonplanar optic axis shift given by Equation (2) is on the order of 10 $\mu$m. In contrast, the linear resonator optic axis shift with a typical focusing power of 0.05 cm$^{-1}$ (20 cm focal length) would be 1 mm. The former is acceptable or even negligible but the latter would be catastrophic.

The behavior of an odd-mirror resonator, either planar or nonplanar, is similar to that of a zero-rotation resonator. The transformation (1) would apply with one change: change z and w on the left, to their complex conjugates. The equations may be solved as before. The result is that depending on the direction of A (i.e., whether it is real or imaginary in the present formalism) the sensitivity is between ¼ and 1/PL. Referring to FIG. 6, misalignments in the "horizontal" plane containing the centers of the three mirrors are robustly constrained, as if the resonator incorporated 180° of rotation, whereas misalignments normal to this plane are constrained only by the focusing power of the mirrors as in a linear resonator. Since it is unrealistic to design for the optimistic case (uncontrolled misalignment only in the harmless direction), the sensitivity must be taken to be 1/PL and is no better than for the zero-rotation case.

Figures 8, 9, 10:
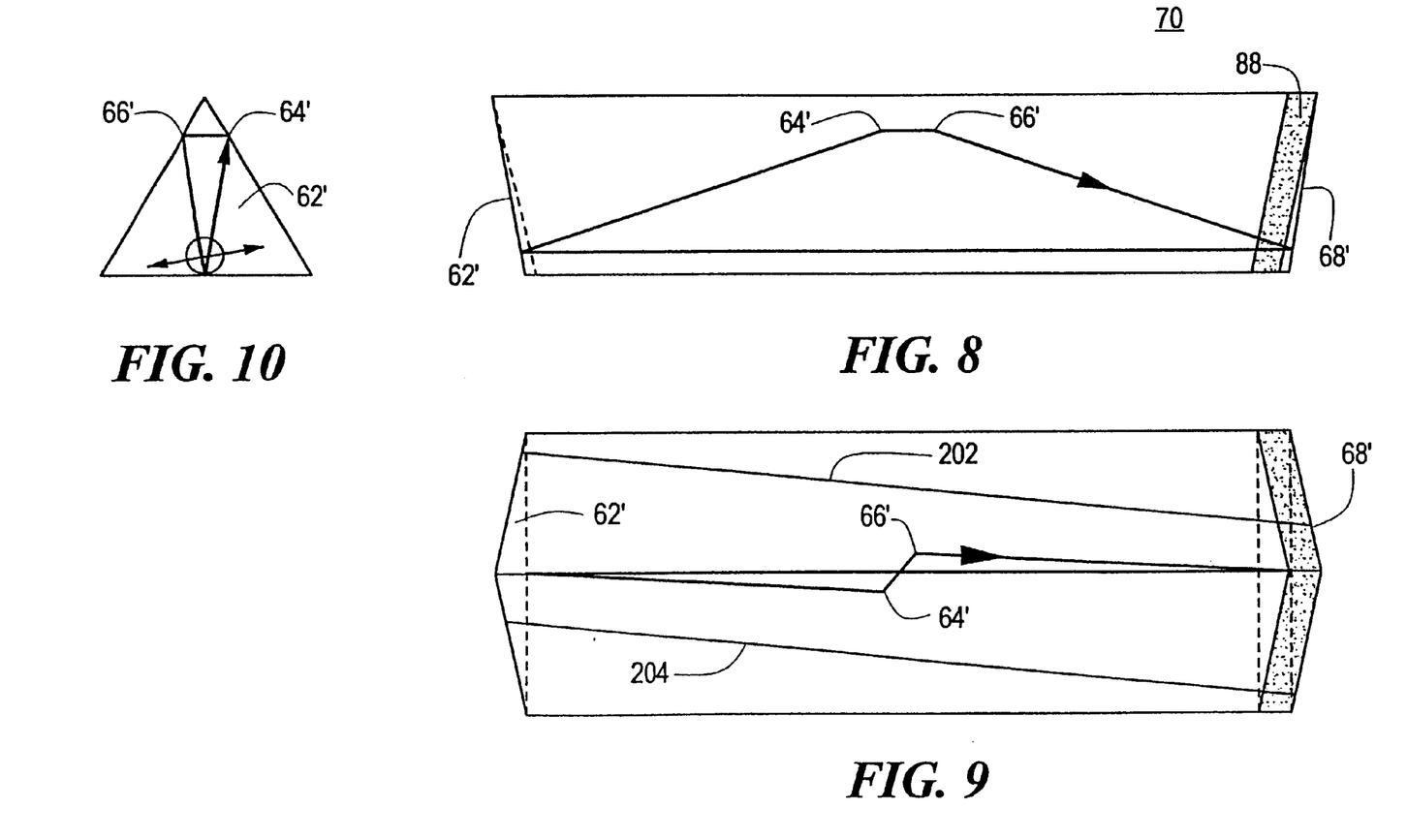
FIG. 8 is a diagrammatic side elevational schematic view of a rod ring resonator according to this invention.
FIG. 9 is a plan view of the rod ring resonator of FIG. 8.
FIG. 10 is an end view of the rod ring resonator of FIG. 8.
Figure 11:
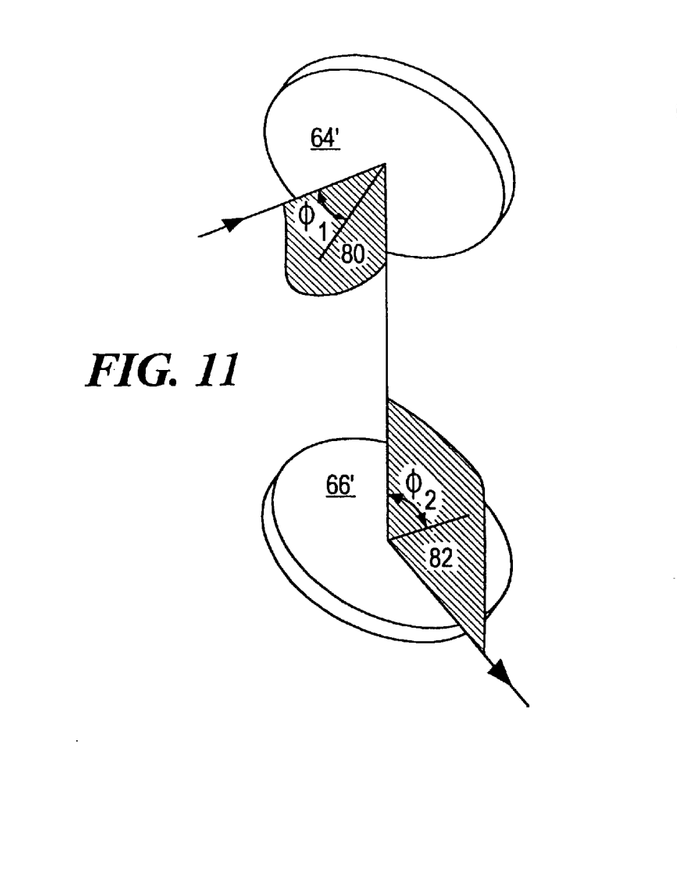
FIG. 11 is a schematic ray diagram showing the total internal reflection which occurs in the rod ring resonator of FIGS. 8–10.

A non-planar even-mirror ring resonator is shown in the form of a rod 70, FIGS. 8, 9 and 10, wherein, for example, mirror 62' can be at one end and mirror 68' at the other with the mirrors 64 and 66 being implemented by surfaces of total internal reflection. By using at least one pair of optically adjacent reflectors 64', 66' to form total internal reflection the deleterious effects of their reflective birefringence can be cancelled. In general a lightwave exhibits a shift in polarization state upon total internal reflection but this effect is annulled when the plane of incidence of one of the pair is substantially perpendicular to the plane of incidence of the other and the angles of incidence of the laser beam on each of the total internal reflecting surfaces are substantially equal as shown with respect to FIGS. 8, 9 and 10. This is shown schematically in FIG. 11 where the incoming beam strikes total internal reflecting surface 64' and then surface 66' and the two surfaces are oriented relative to each other so that the plane of incidence 80 of one of the surfaces is perpendicular to the plane of incidence 82 of the other and the angle of incidence $\phi_1$ of one is equal to the angle of incidence $\phi_2$ of the other. For clarity the angle (~45°)$\phi_1$, $\phi_2$ are shown different than the true angle (~80°).

Figure 12:
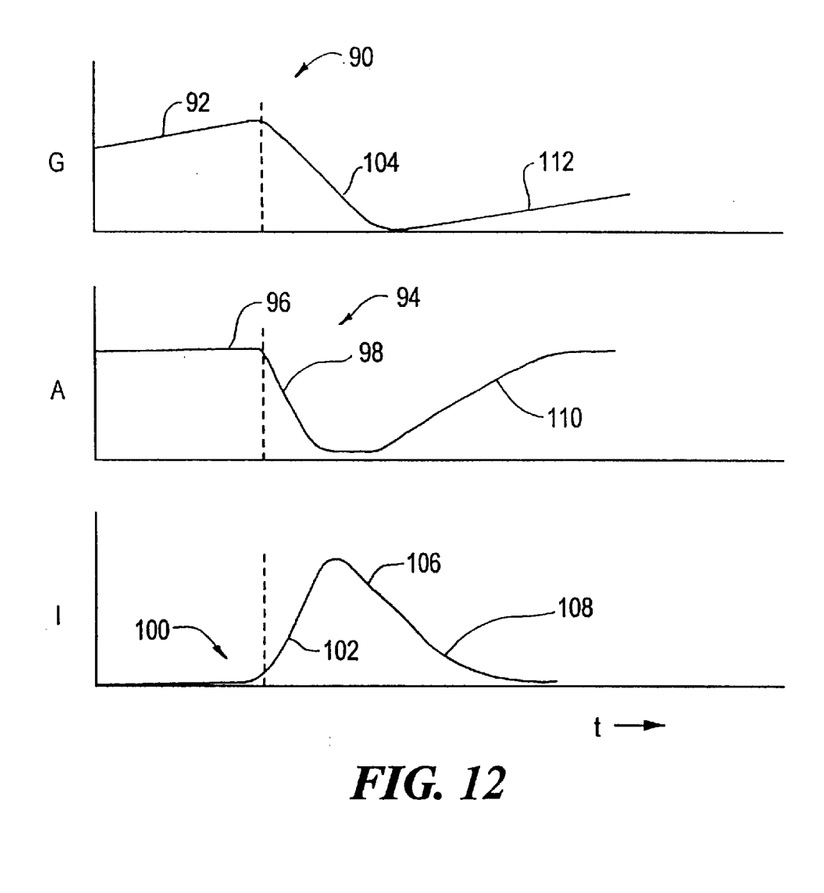
FIG. 12 is a graphical illustration of the variation with time of gain, absorption, and intensity of the laser beam affected by the Q-switch incorporated in the rod ring resonator of FIGS. 8–10.

The higher power obtained from the non-planar ring laser system according to this invention is due in part to the use of a Q-switch. In this particular embodiment the Q-switch is a passive Q-switch and is integral with and in fact may be fused to the rod ring resonator. Thus as shown in FIGS. 8 and 9 resonator 70 may be made of Nd:YAG with an end portion fused onto it of Cr:YAG which acts as a passive Q-switch 88. Alternatively, resonator 70 may be made of YAG co-doped with Nd and Cr. As shown in FIG. 12, passive Q-switch 88 allows the gain 90 to increase as at 92 gradually while the absorption 94 of passive Q-switch 88 remains high as at 96. When the gain exceeds the absorption loss, the intensity 100 begins to build up as at 102. The passive Q-switch 88 becomes saturated and its absorption drops abruptly as at 98, allowing the intensity 100 to rise sharply to a peak as at 106 and produce the laser output while the gain 90 falls as at 104. After the intensity of the pulse has peaked at 106 and starts to decrease as at 108, the absorption begins once again to rise at 110 as does the gain at 112 (more slowly). In this way the power is increased or peaked but without the complications and unreliability of mechanical or electronic devices: it is done wholly passively using the inherent characteristics of the Cr:YAG. An advantage to the use of Cr:YAG is that this material can be fused to the Nd:YAG gain medium to form a composite robust "crystal".

Figure 13A:
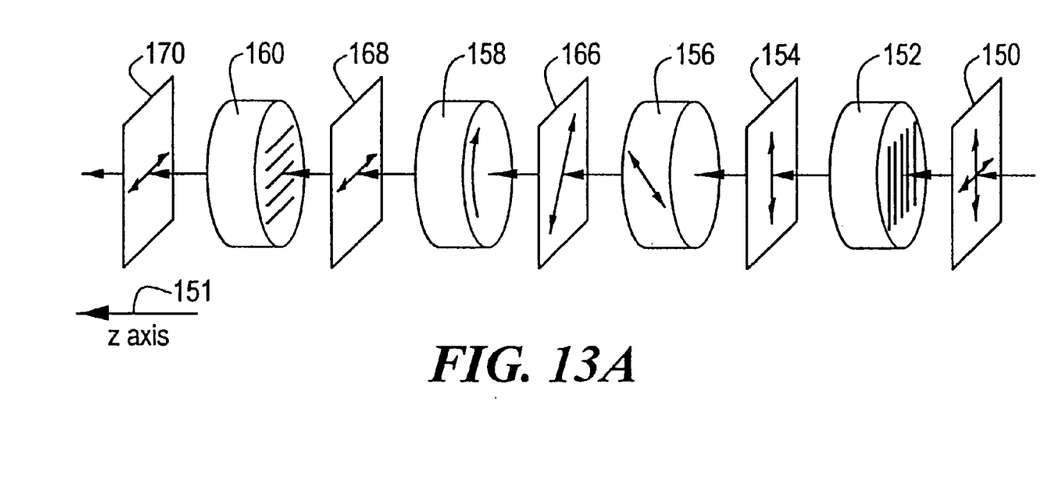
FIGS. 13A and 13B are schematic ray diagrams showing the operation of a typical magnetically controlled Faraday rotator-based optical diode.
Figure 13B:
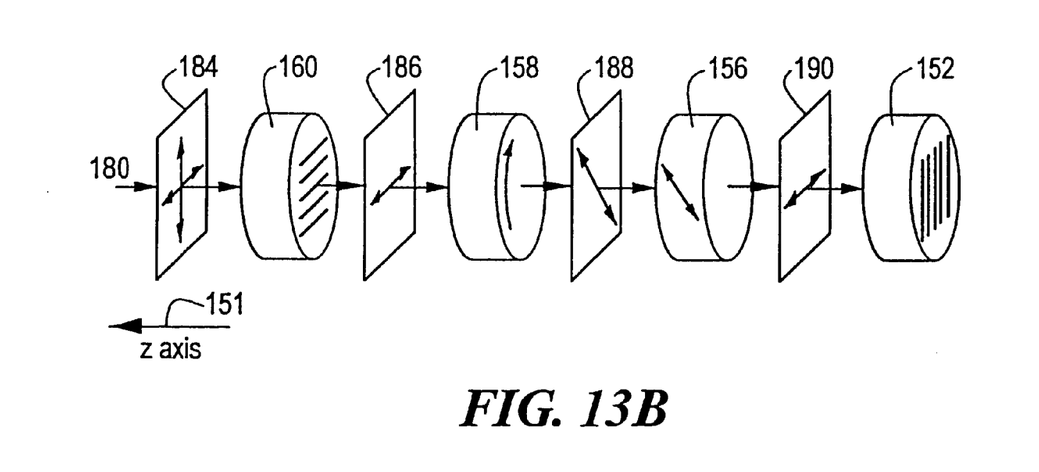

One problem with ring lasers is that they provide bidirectional oscillations so that part of the energy developed is contained in one rotational direction, for example, clockwise, and the remainder in the second direction, e.g., counterclockwise. This is counterproductive since it is difficult and inefficient to combine the two to obtain the full power of the laser and to use only one direction output is to waste a substantial portion of the developed laser energy. To combat this a magnetic controller or Faraday rotator or other form of optical diode may be used. However implemented, the operation of such an optical diode is depicted in FIGS. 13A and B. FIG. 13A shows light going from right to left along the heavy arrows, while FIG. 13B shows light going from left to right. Square planes show the polarization state at various points; round objects are components, as labeled.

Understanding the operation of the optical diode requires realizing the following. Reciprocal rotators operate on light in a manner which is invariant in the co-moving frame, i.e. a reciprocal rotator will rotate the light e.g. clockwise about the direction of propagation. A nonreciprocal rotator, in contrast, rotates the plane of polarization in a certain direction about a space-fixed axis. The reciprocal rotator 156 is symbolized by an arrow which points up to the left and down to the right, symbolizing that light moving leftwards is rotated one way (clockwise) about the z axis 151 while light moving rightwards is rotated the other way (counter-clockwise) about the z axis 151. The nonreciprocal rotator 158 is symbolized by an arrow which points in only one direction, e.g. clockwise about the z axis.

Light of arbitrary polarization 150 incident from the right on vertical polarizer 152 becomes vertically polarized as indicated at 154. This vertically polarized light is submitted to a 45° reciprocal polarization rotator 156 and then to a non-reciprocal 45° polarization rotator 158. Finally, it is submitted to a horizontal polarizer 160. At the output of vertical polarizer 152 the light polarization appears as in diagram 154. After the 45° rotation of rotator 156 the light appears rotated at 45° as shown in diagram 166. After another 45° of rotation by rotator 158 the light appears horizontally polarized as shown in diagram 168 and passes through horizontal polarizer 160 as shown in diagram 170.

When the light is returned incident from the left as shown in FIG. 13B it is input in the direction of arrow 180 in either polarization form as shown in diagram 184. It is polarized horizontally by polarizer 160 as shown in diagram 186 and is presented to rotator 158 horizontally polarized. After passing through rotator 158 the light is polarized at 45° clockwise as shown by diagram 188, and after the 45° of rotation provided by rotator 156 the light appears horizontally polarized as shown in diagram 190. With the horizontal polarization shown in diagram 190 the light is blocked and will not pass through vertical polarizer 152. Since the light going in the return (i.e., rightward, direction is attenuated there will be a difference in the intensity of the two counter-rotating beams, one going clockwise, the other counterclockwise in a ring laser when such an optical diode is interposed along the optic axis.

When such an optical diode is inserted into the optical path within a ring laser, the light traveling in one direction is passed with substantially less loss than light traveling in the opposite direction around the ring. Therefore the intensity of circulating light in one direction is greatly reduced. Since extraction of energy from the gain medium requires the presence of light, energy will be extracted from the gain medium only by the beam traveling in the low-loss direction and thus only the beam in a single direction will contain appreciable laser energy. This effect is rendered substantially more marked in a laser gain medium with homogeneous gain such that any reduction in gain arising from saturation effects caused by one lightwave are felt by all lightwaves substantially equally. Thus all lightwaves experience substantially the same gain and, if there is even a slight difference in the absorption loss between the two directions, unidirectional operation will occur. The homogeneous nature of the Nd:YAG gain therefore means that the optical diode need not exhibit large differential loss; a very small difference in loss suffices to assure unidirectional operation. In the present embodiment, the nonreciprocal polarization rotation is much less than the 45 degrees shown in FIG. 13 and the polarizing elements are only weakly polarizing, being comprised of the differential loss upon reflection of the output mirror 62' in FIGS. 8–10. As is well known, only a small nonreciprocal loss is needed to ensure unidirectional operation of a Nd:YAG ring laser.

Figure 14:
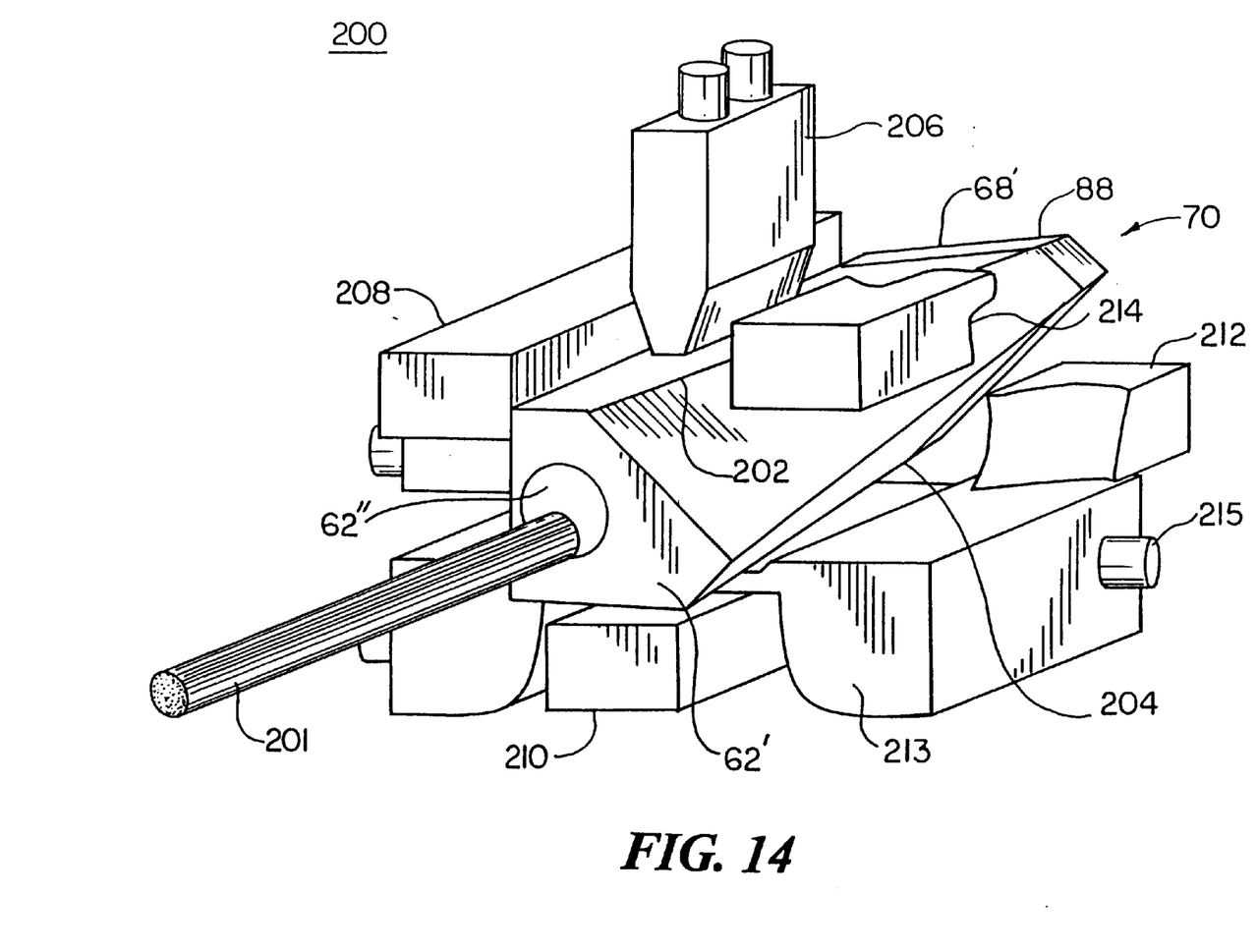
FIG. 14 is a three-dimensional view of a Q-switched non-planar ring laser system according to this invention.

One implementation of a non-planar Q-switched ring laser system 200 according to this invention includes the rod resonator of FIGS. 8, 9 and 10 but trimmed along lines 202 and 204, FIG. 9, to remove excess bulk and weight which is not necessary. The resulting robust monolithic passively Q-switched non-planar Nd:YAG ring laser 200 according to this invention is shown in FIG. 14 where the laser beam 201 is emitted through output mirror 62" and resonator 70 has been trimmed twice more along the lines 202, 204 of FIG. 9, to remove excess bulk and weight. The laser is pumped by one or more diode-laser arrays 206 such as Spectra-Diode Laboratories, Inc., part no. SDL-3245-C1 (50 W peak power, 20% maximum duty cycle). Four magnets 208, 210, 212, and 214 (shown partly cut away for clarity) apply a longitudinal magnetic field to the laser rod and comprise a distributed Faraday rotator. As described previously, the reciprocal polarization rotation is provided by the nonplanar resonator geometry while the polarizer necessary for operation of the distributed optical diode is provided by the output mirror 62", whose reflectivity is different for lightwaves incident upon its internal face having one polarization than for such waves having the other polarization. A heat sink 213 is provided for the rod resonator 70 and includes cooling connection 215.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A non-planar Q-switched ring laser system comprising:
   a ring laser including a gain medium and a closed optical path lying in at least two distinct planes; and
   a Q-switch in said closed optical path for automatically varying the loss in said closed optical path.

2. The non-planar Q-switched ring laser system of claim 1 in which said closed optical path includes a non-planar arrangement of an even number of reflectors at least four in number.

3. The non-planar Q-switched ring laser system of claim 1 in which said Q-switch is a passive Q-switch.

4. The non-planar Q-switched ring laser system of claim 1 in which said Q-switch is integrally formed with said gain medium.

5. The non-planar Q-switched ring laser system of claim 1 in which said gain medium includes Nd:YAG.

6. The non-planar Q-switched ring laser system of claim 5 in which said Q-switch includes Cr:YAG.

7. The non-planar Q-switched ring laser system of claim 6 in which said Nd:YAG and Cr:YAG are fused together.

8. The non-planar Q-switched ring laser system of claim 6 in which the gain medium includes YAG co-doped with Nd and Cr.

9. The non-planar Q-switched ring laser system of claim 2 further including an optical diode for limiting the direction of oscillation of the laser to one of two possible senses.

10. The non-planar Q-switched ring laser system of claim 9 in which at least one pair of optically adjacent said reflectors includes means for totally internally reflecting the output beam from said laser.

11. The non-planar Q-switched ring laser system of claim 10 in which the plane of incidence of a one of said pair of means for totally intern ally reflecting is substantially perpendicular to the plane of incidence of the other of said pair.

12. The non-planar Q-switched ring laser system of claim 11 in which the angle of incidence of the laser output beam on each of said means for totally internal reflecting are substantially equal.

* * * * *